(12) United States Patent
Tinnakornsrisuphap et al.

(10) Patent No.: US 8,059,595 B2
(45) Date of Patent: Nov. 15, 2011

(54) HANDOFF OF DATA ATTACHMENT POINT (75) Inventors: Peerapol Tinnakornsrisuphap, San Diego, CA (US); Fatih Ulupinar, San Diego, CA (US); Parag A. Agashe, San Diego, CA (US); Ragulan Sinnarajah, Markham (CA); Ravindra Patwardhan, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 858 days.

(21) Appl. No.: 12/046,062

(22) Filed: Mar. 11, 2008

(65) Prior Publication Data

US 2008/0247360 A1 Oct. 9, 2008

Related U.S. Application Data

(60) Provisional application No. 60/910,628, filed on Apr. 6, 2007, provisional application No. 60/911,858, filed on Apr. 13, 2007, provisional application No. 60/943,459, filed on Jun. 12, 2007.

(51) Int. Cl.
*H04W 4/00* (2009.01)
(52) U.S. Cl. ................................................... 370/329
(58) Field of Classification Search .................. None
See application file for complete search history.

(56) References Cited

U.S. PATENT DOCUMENTS

| | | | |
|---|---|---|---|
| 5,267,251 A | 11/1993 | Lenoir et al. | |
| 5,267,261 A | 11/1993 | Blakeney, II et al. | |
| 7,350,077 B2 | 3/2008 | Meier et al. | |
| 7,583,634 B2 | 9/2009 | Gillies et al. | |
| 7,606,204 B2 * | 10/2009 | Sebastian et al. | 370/334 |
| 7,689,210 B1 | 3/2010 | Bims | |
| 2001/0006514 A1 * | 7/2001 | Park | 370/331 |
| 2005/0096055 A1 * | 5/2005 | Colban et al. | 455/442 |
| 2005/0237962 A1 | 10/2005 | Upp et al. | |
| 2005/0243772 A1 | 11/2005 | Lee et al. | |
| 2006/0109818 A1 * | 5/2006 | Ramanna et al. | 370/331 |
| 2006/0153110 A1 * | 7/2006 | Morgan et al. | 370/310 |
| 2007/0171871 A1 * | 7/2007 | Forsberg | 370/331 |
| 2008/0274751 A1 * | 11/2008 | Tinnakornsrisuphap et al. | 455/456.1 |
| 2008/0310335 A1 * | 12/2008 | Wang et al. | 370/310 |
| 2009/0003242 A1 * | 1/2009 | Tinnakornsrisuphap et al. | 370/255 |
| 2009/0040981 A1 * | 2/2009 | Agashe et al. | 370/331 |
| 2009/0046767 A1 * | 2/2009 | Tinnakornsrisuphap et al. | 375/211 |
| 2009/0176489 A1 * | 7/2009 | Ulupinar et al. | 455/432.2 |

FOREIGN PATENT DOCUMENTS

GB 2409377 6/2005
KR 20050104191 A 11/2005

OTHER PUBLICATIONS

International Search Report and Written Opinion—PCT/US2008/059474—International Search Authority, European Patent Office, Nov. 3, 2009.

* cited by examiner

*Primary Examiner* — Chi Pham
*Assistant Examiner* — Fan Ng (57) ABSTRACT

In a communication system in which a gateway entity is linked to a plurality of infrastructure entities which in turn are operable to communicate with an access terminal, the access terminal needs first to establish a data attachment point (DAP) with one of the infrastructure entities. Handoff of the DAP from one infrastructure entity to another infrastructure entity is initiated by the access terminal. The access terminal weighs factors such as the link conditions with the various infrastructure entities, the time since the last DAP handoff, and time duration communicating with the current infrastructure entity before proceeding with the DAP handoff.

35 Claims, 8 Drawing Sheets

HANDOFF OF DATA ATTACHMENT POINT

CLAIM OF PRIORITY UNDER 35 U.S.C §119

The present application for patent claims priority to U.S. Provisional Application Nos. 60/910,628, 60/911,858 and 60/943,459, filed on Apr. 6, 2007, Apr. 13, 2007 and Jun. 12, 2007, respectively, and all are assigned to the assignee hereof and expressly incorporated by reference herein.

BACKGROUND

I. Field

The present invention generally relates to communications, and more particularly, to handoff of data attachment points in wireless communication systems.

II. Background

In telecommunications, especially wireless communications, communication environments are not static but rather dynamic. In a mobile communication setting, some communication entities such as an Access Terminal (AT) may move from one location to another at different points in time.

Figures 1, 2:
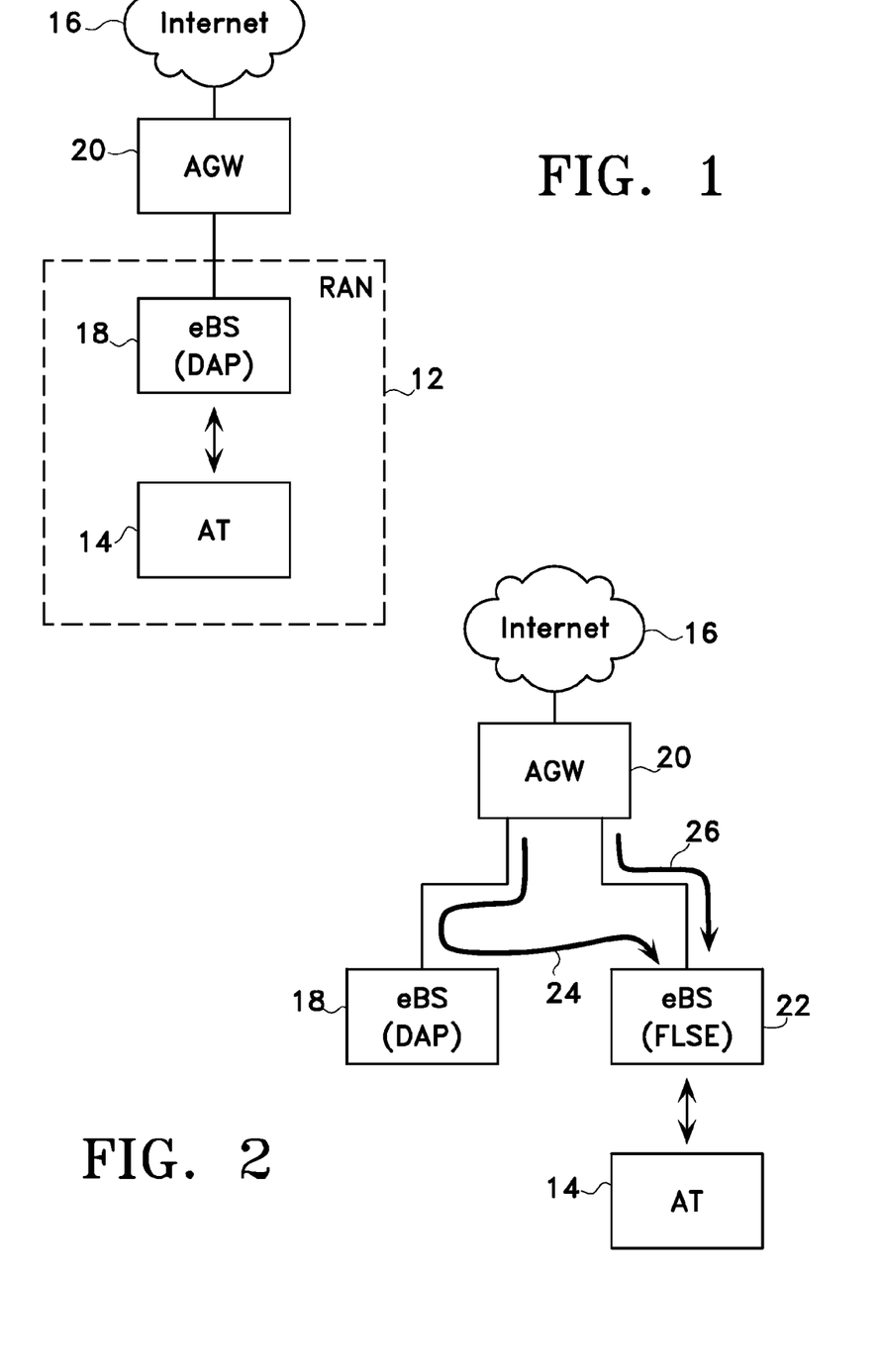
FIG. 1 is a simplified schematic drawing illustrating an exemplary communication system.
FIG. 2 is another simplified schematic drawing illustrating the mobility of an access terminal in the communication system.

Reference is directed to FIG. 1 which shows a simplified schematic illustrating an exemplary communication system. In the following description, terminology associated with a Ultra Mobile Broadband (UMB) system is used. The basic terminology and principles of operations of the UMB system can be found from a publication by the $3^{rd}$ Generation Partnership Project 2 (3GPP2) established by the Telecommunication Industry Association (TIA), entitled "Interoperability Specification," 3GPP2-A.S0020. As shown in FIG. 1, within the Radio Access Network (RAN) 12, for example, in a Ultra Mobile Broadband (UMB) system in which an AT 14 is accessing a backbone network 16 via an evolved Base Station (eBS) 18 wirelessly. The eBS 18 serves as a data exchange entity between the AT 14 and an Access Gateway (AGW) 20. The AGW 20 has direct access to the backbone network 16. The backbone network 16 can be the Internet, for instance.

In FIG. 1, the eBS 18 serves as the Data Attachment Point (DAP) for the AT 14. More specifically, the eBS 18 serving as the DAP has the forward link traffic binding with the AGW 20, for example, as operated under the Proxy Mobile IP (PMIP) protocol promulgated by the Internet Engineering Task Force (IETF). Under the PMIP protocol, the AGW 20 sends forward-link data traffic to the DAP, the eBS 18 in this case, which in turn directs the data traffic to the AT 14. The eBS 18, acting as the DAP, is the network entity which performs the last binding with the AGW 20.

In a wireless environment, the AT 14 is mobile. That is, the AT 14 may move from one location to another, within the same RAN 12 or to a different RAN.

Reference is now directed to FIG. 2 which shows another simplified schematic illustrating the mobility of the AT 14.

Suppose in FIG. 2, the AT 14 originally communicating with eBS 18 now moves away from eBS 18 and begins to communicate with the eBS 22. The eBS 22 is now called the Forward-Link Serving eBS (FLSE) for the AT 14 as it is the eBS 22 that directly communicates and exchanges data with the AT 14. However, there has not been any binding update with the AGW 20. That is, the network entity that performed the last binding with the AGW 20 was still the eBS 18 and there has not been any binding update with the AGW 20 since then. As such, the eBS 18 still serves as the DAP. Under such a scenario, data from the AGW 20 is sent to the eBS 18 which is the DAP in this case, and then routed to the AT 14 to the eBS 20 which serves as the FLSE. Data packets from the AGW 20 to the AT 14 are routed according to the data path 24 as shown in FIG. 2.

Even though the AT 14 has roamed away from the coverage area served by the eBS 18, the eBS 18 remains the DAP for the AT 14. The reason is in a wireless setting, depending on the mobility of the AT 14, it is possible that the eBS 18 may again become the FLSE for the AT 14. For instance, the AT 14 may be on the boundary line of the coverage areas provided by both the eBS 18 and the eBS 22. Consequently, the AT 14 may only communicate with the eBS 22 temporarily. However, if the communications between the AT 14 and the eBS 22 are not temporary, routing data packets via the meandering data path 24 may not be an efficient usage of communication resources, at least from the perspective of backhaul utilization. In addition, packet data latency is also impacted. Instead, the DAP is preferably switched from the eBS 18 to the eBS 22. For such a DAP switch, the eBS 22 needs first to perform a forward link traffic binding with the AGW 20. After the successful completion of the forward link traffic binding process, the eBS 22 becomes the current DAP. Data packets are then routed from the AGW 20 to the AT 14 via the eBS 22, as shown by the data path 26 in FIG. 2. The switch of DAP from BS 18 to eBS 22 can be based on certain criteria, for example, after it is assured that the AT communicates with eBS 22 for a predetermined period of time.

Heretofore, switching or selection of the DAP, called a DAP handoff, has mostly been AN-initiated. In the AN-initiated handoff, the handoff process is transparent to the AT 14. However, problems may arise if the AN 14 has no knowledge of the handoff. For instance, the intended DAP may turn out to be the non-intended DAP. This is especially true in a asynchronous environment in which the various communication entities are not synchronized with each other. Referring back to FIG. 2, again suppose the AT 14 is at the boundary of the coverage areas of both eBS 18 and eBS 22. Sensing the presence of the AT 14, e.g., via the downlink signal strength, in an AN-initiated handoff, both the eBS 18 and the eBS 22 attempt to be the DAP by registering with the AGW 20 for the forward-link binding. Further suppose that the AT 14 is well settled within the coverage area provided by the eBS 18, and consequently the eBS 18 should be the most suitable DAP for the AT 14. Nevertheless, if registration messages sent and received between the AGW 20 and the eBS 22 are faster than those between the AGW 20 and the eBS 18, the eBS 22 can be assigned as the DAP ahead of the eBS 18, contrary to what was intended. Recovery of the wrongly assigned DAP, even if not fatal to the communication session involved, requires additional signaling and messaging which unnecessarily tie up communication resources.

Accordingly, there is a need to provide a DAP assignment scheme with more accuracy and certainty, thereby allowing more efficient utilization of communication resources.

SUMMARY

In a communication system in which a gateway entity is linked to a plurality of communication entities which in turn are operable to communicate with an access terminal, the access terminal needs first to establish a data attachment point (DAP) with one of the communication entities. Handoff of the DAP from one communication entity to another communication entity is initiated by the access terminal. Before proceeding with the DAP handoff, the access terminal may consider factors such as the link conditions with the various communication entities, the time since the last DAP handoff, and the time duration communicating with the current communication entity. To prevent any race conditions for the communication entities to register as the DAP, the access terminal may refer to the time stamps of the messages received from the communication entities. Furthermore, the communication entities may also exchange messages with each other regarding the current DAP registration status.

These and other features and advantages will be apparent to those skilled in the art from the following detailed description, taken together with the accompanying drawings, in which like reference numerals refer to like parts.

DETAILED DESCRIPTION

The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

Furthermore, in the following description, for reasons of conciseness and clarity, terminology associated with the Ultra Mobile Broadband (UMB) technology as promulgated under the $3^{rd}$ Generation Partnership Project 2 (3GPP2) by the Telecommunication Industry Association (TIA) is used. It should be emphasized that the invention is also applicable to other technologies, such as technologies and the associated standards related to Code Division Multiple Access (CDMA), Time Division Multiple Access (TDMA), Frequency Division Multiple Access (FDMA), Orthogonal Frequency Division Multiple Access (OFDMA) and so forth.

Figure 3:
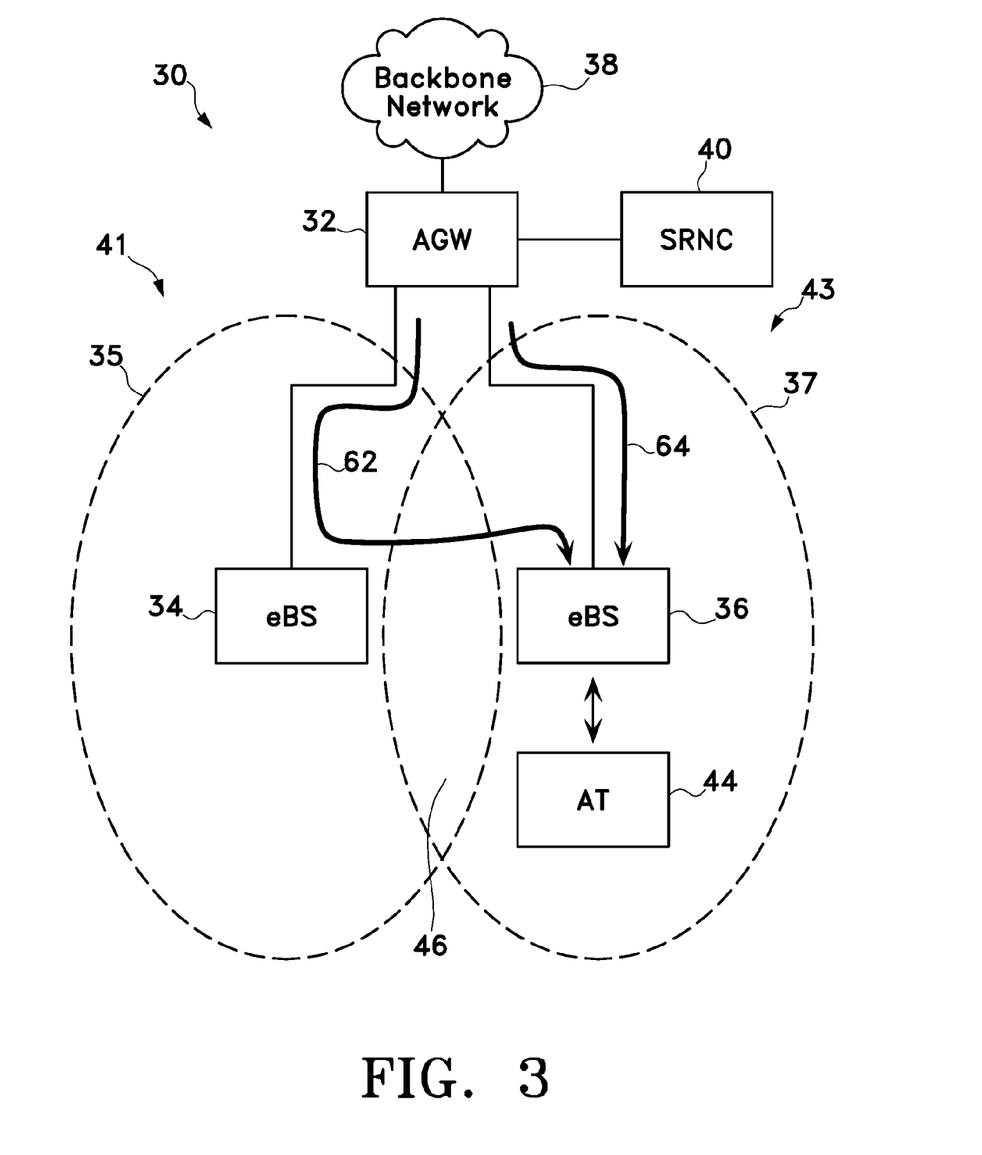
FIG. 3 is a simplified schematic drawing which shows the relationships of the various communication entities arranged in accordance with an exemplary embodiment of the invention.

Reference is now directed to FIG. 3 which schematically shows the relationships of the various communication entities arranged in accordance with an exemplary embodiment of the invention.

In FIG. 3, the overall communication system is generally signified by the reference numeral 30. In the communication system 30, there is an Access Gateway (AGW) 32 linked to a plurality of evolved Base Stations (eBSs), two of which are shown as eBS 34 and eBS 36. The eBS 34 and eBS 36 can be installed in the same Access Network (AN) or different ANs. In this example, the eBSs 34 and 36 are parts of an AN 41 and AN 43, respectively. Each of the AN 41 and AN 43 may include one or more eBSs and other entities. For the sake of clarity and conciseness, each AN is shown with only one eBS in FIG. 3. In the embodiment as shown in FIG. 3, the eBS 34 provides wireless access to users within a coverage area 35. Likewise, the eBS 36 provides wireless access within a coverage area 37. The AGW 32 has linkage to a backbone network 38, which can be the Internet, for instance. The backbone network 38 can be an intranet in a closed network, as another example.

There is a Session Reference Network Controller (SRNC) 40 linked to the AGW 32. The SRNC 40 serves several functions. For instance, the SRNC 40 provides authentication function to an Access Terminal (AT), such as an AT 44 shown in FIG. 3. Furthermore, the SRNC 40 stores the communication session of the AT 44 for any new eBS that is prepared to communicate with the AT 44. The SRNC 40 also controls the idle-state paging procedures in general.

Suppose the AT 44 is capable of moving among the various radio networks, including the AN 41 and the AN 43. For the AT 44 to access the backbone network 38, the AT 44 needs first to establish a Data Attachment Point (DAP) with a communication entity, such as the eBS 34 or the eBS 36. In this specification and the amended claims, the term "data attachment point" is construed as a communication entity that anchors data, either directly or indirectly, to and from a network gateway. By way of illustration, for example, as shown in FIG. 3, if the eBS 34 is designated as the DAP, data from the backbone network 38, after passing through a gateway entity, the AGW 32 in this case, is anchored by the communication entity serving as the DAP, the eBS 34 in this case, before reaching other communication entities, such as the eBS 36, via the data path 62. In this example, the eBS 34 anchors data directly from the AGW 32 via the data path 62. The same holds true with the reverse data flow. That is, data received from other communication entities are anchored by the DAP before reaching the gateway entity.

In an AN-initiated DAP assignment arrangement, each of the eBS 34 and eBS 36 proceeds with the DAP assignment process if certain criteria are met. For example, when the eBS 34 becomes the Forward-Link Serving eBS (FLSE) for the AT 44, it may start the DAP assignment process. Thus, if the eBS 34 is the current FLSE, the eBS 34 sends a registration request message to the AGW 32. Thereafter, the AGW 32 performs a binding update with the eBS 34 in accordance with the procedures as set forth under the Proxy Mobile IP (PMIP) protocol published by the Internet Engineering Task Force (IETF).

Suppose the communication system 30 is a synchronous system. That is, all the communication entities, e.g., the AGW 38, the eBS 34 and the eBS 36, etc., operate in accordance with a master time reference. The master reference can be the Global Positioning System (GPS) time, for instance. In that case, a predefined DAP registration protocol can be set up, such as by allowing the first arrived request to be processed and approved as the DAP until the next approval. However, problems may arise if the system 30 is an asynchronous system. Because of the lack of a master time reference, erroneous DAP assignment may result.

Figure 4:
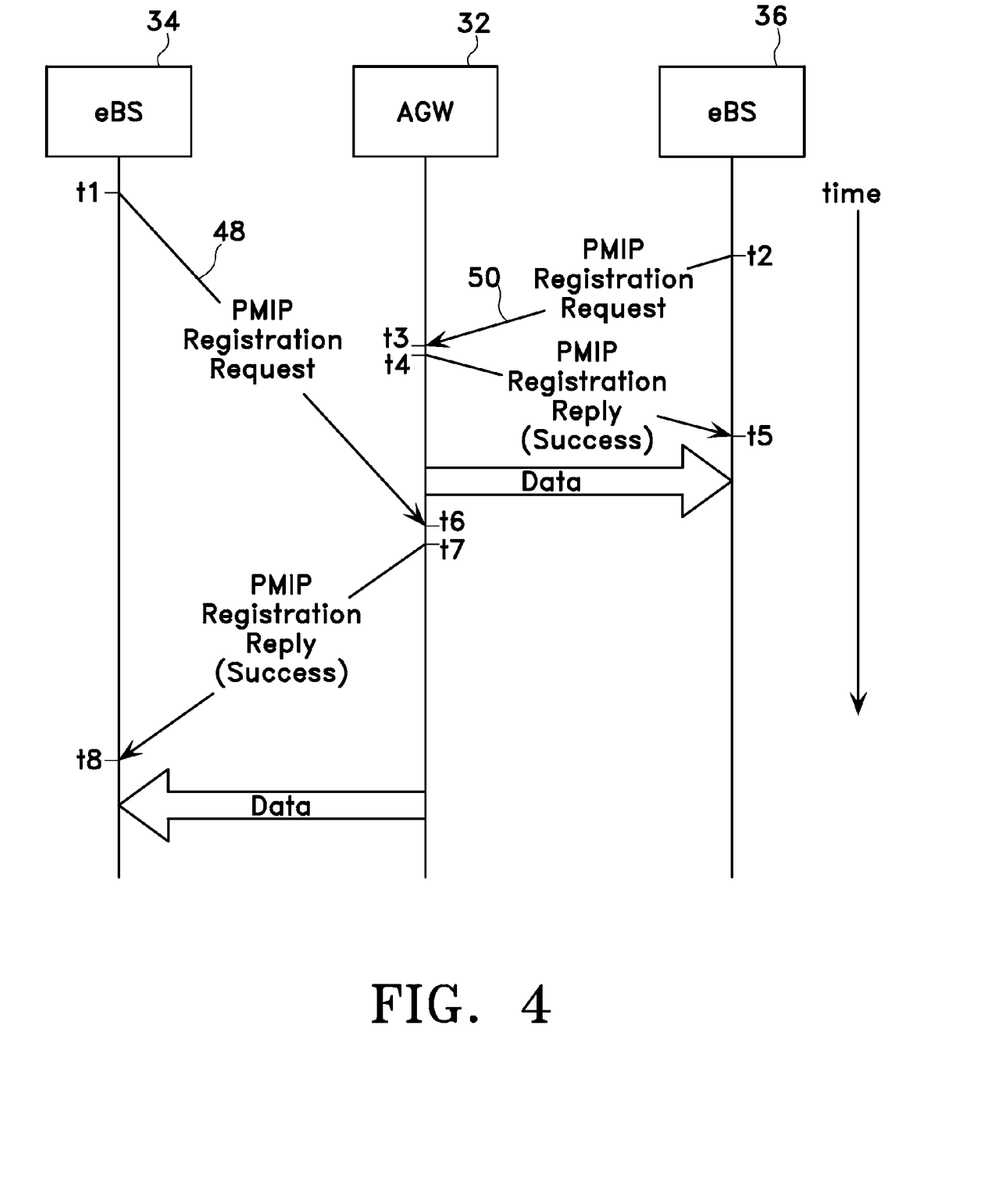
FIG. 4 is a call flow diagram which shows the message flows among the different communication entities operating in an asynchronous system in which the DAP handoff is not AT-assisted.

Reference is now directed to FIG. 3 in conjunction with FIG. 4 which show the sequence of message flows among the different entities. Suppose the system 30 is a system using the AN-initiated DAP handoff scheme. Further suppose the AT 44 moves into the overlapping zone 46 of the coverage areas 35 and 37 at this juncture. The eBS 34, sensing the presence of the AT 44, sends a registration request message at time t1 to the AGW 32, attempting to register with the AGW 32 as the DAP for the AT 44 as shown by message flow 48 in FIG. 4. Assume there is a "first-come first-serve" rule put in place in the system 30. Under such a rule, the eBS 34, being the first to send the registration request message, is intended to be the DAP for the AT 44.

With the AT 44 in the coverage overlapping zone 46, suppose the eBS 36 also senses the presence of the AT 44. In this example, the eBS 36 also sends a registration request message to the AGW 32 at time t2, as shown by the message flow 50 in FIG. 4. Here, t2 is later in time than t1.

For some reasons, the message sent via the message flow 50 arrives at the AGW 32 earlier than that of the message flow 48. More specifically, the message sent by the eBS 36 arrives at the AGW 32 at time t3, while the corresponding message sent by the eBS 34 arrives at the AGW 32 at time t6. In this case, the time t6 is later that the time t3. The above scenario can occur, for example, in a communication environment in which the eBS 36 has better communication conditions as compared to that of the eBS 34.

As for the AGW 32, since it receives the registration message from the eBS 36 at the time t3, under the "first-come-first-serve" rule, the AGW 32 approves of the request and sends a registration success message to the eBS 36 at a time t4 and reaches the eBS 36 at a time t5. Consequently, the eBS 36 is successfully registered as the DAP for the AT 44.

Suppose the AGW 32 also receives the registration request message from the eBS 34 at a time t6. The time t6 is later in time than the time t5 which is the time the eBS 36 successfully registers with the AGW 32 as the DAP for the eBS 34.

Depending on the registration protocol implemented in the AGW 32, the AGW 32 may assume that the eBS 34 wants to take over the role as the new DAP, replacing the current DAP eBS 36.

Thereafter, the AGW 32 sends a registration success reply to the eBS 34 at time t7 and reaches the eBS 34 at a time t8. The eBS 34 then assumes the new role as the DAP.

In the above example, the eBS 34 is intended to be the DAP in the first place, that is, without the eBS 36 taking the intermediate DAP role. Such a DAP assignment may create problems. Even suppose there is no damage to the data of the communication session, such a DAP assignment may cause persistent and inefficient traffic routing, and consequently unnecessarily tying up communication resources. Any attempt for error recovery surely requires extra time and resources with additional complexities It further should be noted that although the PMIP binding messages sent by the eBS 34 and the eBS 36 via the message flows 48 and 50, respectively, may have timestamps to prevent out-of-order binding updates. Nevertheless, since the system 30 operates asynchronously, the timestamps may be ineffective to perform their functions. The reason is each of the communication entities, such as the eBS 34 or the eBS 36, operates on its own time reference in an asynchronous system. The timestamps on the binding messages sent to the AGW 32 are not with respect to a master time reference but rather the references of the individual entities. The time references of the entities may have wide offsets amount each other. Consequently, the problem as mentioned above can still occur.

Figure 5:
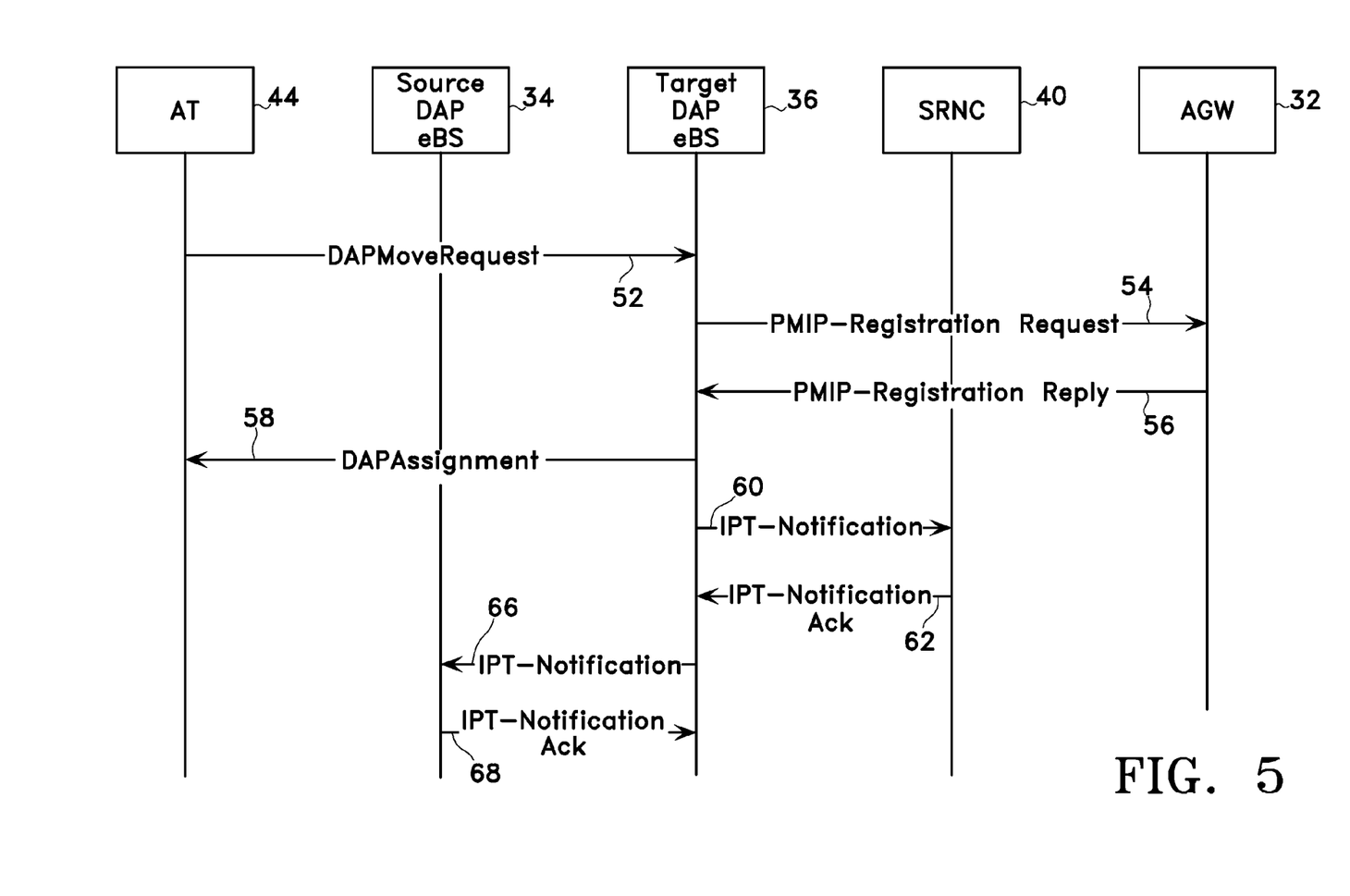
FIG. 5 is a call flow diagram which shows the message flows among the different communication entities operating in a synchronous system in which the DAP handoff is AT-assisted.

FIG. 5 is a message flow diagram which illustrates an AT-assisted or AT-initiated DAP handoff scheme in accordance an exemplary embodiment of the invention. Hereinbelow, the terms "AT-assisted" and "AT-initiated" are used interchangeably.

Reference is now made to FIG. 5 in conjunction with FIG. 3. Suppose the AT 44 is initially in communication with the eBS 34 which is the last entity that performed the PMIP binding with the AGW 40. As such, the eBS 34 is the current DAP for the AT 44.

The AN 44 has a Route Set (RS) in its memory. The RS includes a set of communication entities, such as the eBS 34 and the eBS 36, that have air-interface routes with the AT 44, whereby each entity in the RS may tunnel both the link-layer packets and the IP packets with the AT 44, and vice versa. In an AT-assisted or AT-initiated DAP handoff, the AT 44 assists the communication entities in the RS in making the decision as to which entity in the RS should be the DAP.

An AT-assisted handoff prevails over a corresponding AN-initiated handoff in several aspects.

First, in an asynchronous system, such as the system previously depicted in FIG. 4, race conditions may occur as explained above. The AT-assisted DAP handoff is more capable of avoiding such a problem. For instance, the AT need not initiate another DAP move until the response from the earlier DAP move is received and finalized.

Second, the DAP is the data anchor for the AT from the AGW in a RAN. It is preferable to have the DAP in the AT's RS. As a consequence, flexibility and fast updates when needed can be made possible. For instance, suppose the AGW needs to update a policy for the AT and the change is required during the AT's current communication session. The change can be transmitted from the AGW to the DAP which in turn relays the change to the AT for update swiftly. On the other hand, if the DAP is not in the AT's RS, the change cannot possibly be updated as easily and expeditiously.

Furthermore, the AT has first hand knowledge of its link conditions with the various eBSs in the RS. Accordingly, the AT is in a better position to determine whether the currently communicating eBS, i.e., the FLSE, is stable enough to act as a DAP.

In addition, the AT-assisted DAP handoff is simpler than the AN-initiated DAP handoff, both in the number of messages exchanged and in implementation.

Reference is now returned to FIGS. 3 and 5. Suppose the AT 44 moves to the coverage area 37 of the eBS 36. The AT 44 then communicates with the eBS 36. Consequently, the eBS 36 acts as the FLSE for the AT 44.

In an AT-assisted handoff as described in this embodiment, the AT may weigh and assess certain criteria or conditions prior to decide whether to start the DAP handoff process. Among other things, the AT may consider whether the time duration communicating with the current FLSE has reached a predetermined length. This is to avoid designating the FLSE as the DAP if communications with the FLSE are only temporary. Furthermore, the AT may decide whether a predetermined time has elapsed since the last handoff prior to starting the AT-assisted handoff process. The reason is it is undesirable for the AT to handoff DAPs too frequently, because frequent and unnecessary handoffs can result in inefficient consumption of communication resources. Equally as important, the AT may assess the communication link conditions with the various eBSs so as to decide whether a DAP handoff is justifiable. It certainly would not a good move for the AT to handoff the DAP to the FLSE that the AT is having unfavorable communication conditions communicating with the FLSE.

Suppose in this example, after determining that a certain amount of time has elapsed and the radio link conditions are favorable with the eBS 36, the AT 44 decides to handoff the DAP from the eBS 34 to the eBS 36. In the following description, the eBS 34 is called the source DAP eBS. The eBS 36 is called the target DAP eBS. The handoff process starts with the AT 44 sending a request message, here called the DAPMoveRequest message to the target DAP eBS 36. The flow path of the request message is signified by the reference numeral 52 as shown in FIG. 5. The target DAP eBS 36 may accept or deny the request, for example, depending on the congestion level of the on-going calls passing through the eBS 36.

If the target DAP eBS 36 accepts the request, the target DAP eBS 36 updates the data attachment binding with the AGW 32 by sending a PMIP-Registration Request message to the AGW 32, for example, via the PMIPv4 protocol. The message flow is designated by the reference numeral 54 as shown in FIG. 5.

The AGW 32 confirms the binding update by sending a PMIP-Registration Reply message to the target DAP eBS 36, as shown by the message flow 56 in FIG. 5. Thereafter, a data tunnel can be set up between the AGW 32 and the AT 44 via the target DAP eBS 36. In the PMIP-Registration Reply message, a life-time parameter of the data tunnel can be included. The life-time parameter is to prevent the scenario that when the AT 44 goes dormant, the tunnel is still maintained resulting in unproductive utilization of communication resources. If the AT 44 needs to maintain active communications after the lifetime is reached, the AT 44 has to send another DAPMoveRequest message to the eBS 36 before expiration of the lifetime.

After the completion of the binding update process, the target DAP eBS 36 responds to the AT 44 with a DAPAssignment message, as shown in the message flow path 58 shown in FIG. 5. The DAPAssignment message informs the AT 44 whether the DAP handoff is successful. Moreover, the DAPAssignment message can include, among other things, a timestamp issued by the AGW 32 for the successful PMIP registration with the target DAP eBS 36, and further the remaining lifetime of the binding data tunnel. If the timestamp of the DAPAssignment message is set to a value lower than the corresponding timestamp of the previous DAPAssignment message processed by the AT 44, the AT 44 may disregard the DAPAssignment message. i.e., the message sent via the flow path 58. Operating in this manner, the race condition as described in FIG. 4 can be avoided.

On the other hand, if the timestamp in the DAPAssignment message via the flow path 58 has the latest value, i.e., a value higher than any of the corresponding timestamps of the previously processed DAPAssignment messages by the AT 44, the AT 44 can mark the data path route to the target eBS 36 as the DAP route. In addition, the AT 44 can mark the other data path routes to the other eBS as not the DAP route. At the same time, the AT 44 may initiate its own timer associated with the freshly marked DAP route to regulate the frequency of DAP handoffs. As mentioned earlier, it is preferable not to perform DAP handoffs too often, e.g., at the slight change of link conditions. Frequent and unnecessary DAP handoffs may affect the loading at the AGW 32, for example.

Thereafter, the target DAP eBS 36 notifies all the eBSs in the RS of the AT 44 as taking over the role as the DAP for the AT 44. The notification is in the form of an Internet Protocol Tunnel (IPT)-Notification message to all eBSs and any related entities in the RS of the AT 44. One of which is shown in the message path 60 sent by the target eBS 36 to the Session Reference Network Controller (SRNC) 40. The IPT-Notification message as sent via the path 60 serves several purposes. First, the target DAP eBS 36 informs the other eBSs that the target DAP eBS 36 is now the current DAP. Moreover, the IPT-Notification message may also include the message sequence number and the timestamp that the target DAP eBS 36 used in updating the data attachment binding with the AGW 32 previously.

For the SRNC 40 to acknowledge that the eBS 36 is the current DAP, the SRNC 40 sends an IPT-Notification Ack, as shown by the message flow path 62 in FIG. 5.

Other than notifying other eBSs as assuming the DAP role as mentioned above, in particular, the target eBS 36 informs the source DAP 34 of taking over the role as the current DAP by sending an IPT-Notification message to the source DAP eBS 34 as shown by the message flow path 66 in FIG. 5. The IPT-Notification message informs the source DAP eBS 34 that the target eBS 36 is the current DAP eBS. Again, the IPT-Notification message can include the message sequence number and the timestamp that the target DAP eBS 36 used in updating the data attachment binding with the AGW 32.

For the source DAP eBS 34 to acknowledge that the eBS 36 is the current DAP, the source DAP eBS 34 needs to send an IPT-Notification Ack message, as shown by the message flow path 68 in FIG. 5. Optionally, the IPT-Notification Ack message may indicate whether the sender of which message is the current FLSE of the AT 44. After receipt of the IPT-Notification Ack message, the target eBS 36 completes the DAP handoff process. Thereafter, the IP packet flow, instead of meandering through the eBS 34 via the data packet flow path 62, as shown in FIG. 3, directly flows through the eBS 36 via the data packet flow path 64.

Figure 6:
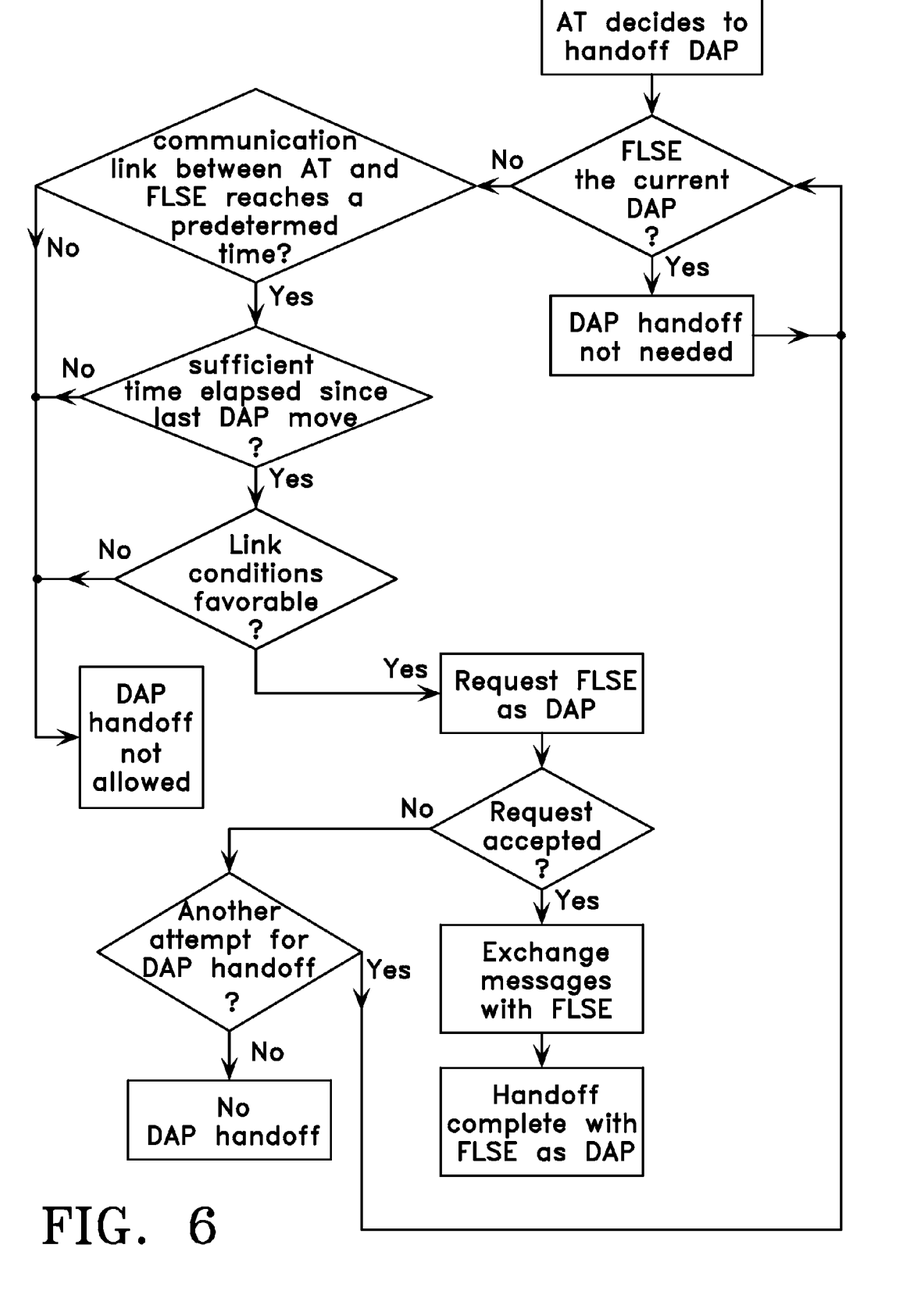
FIG. 6 is a flowchart which shows the procedures the AT takes in determining the AT-assisted DAP handoff.

FIG. 6 shows a flow diagram which summarizes the procedures that the AT 44 takes in determining a AT-assisted DAP handoff.

Figure 7:
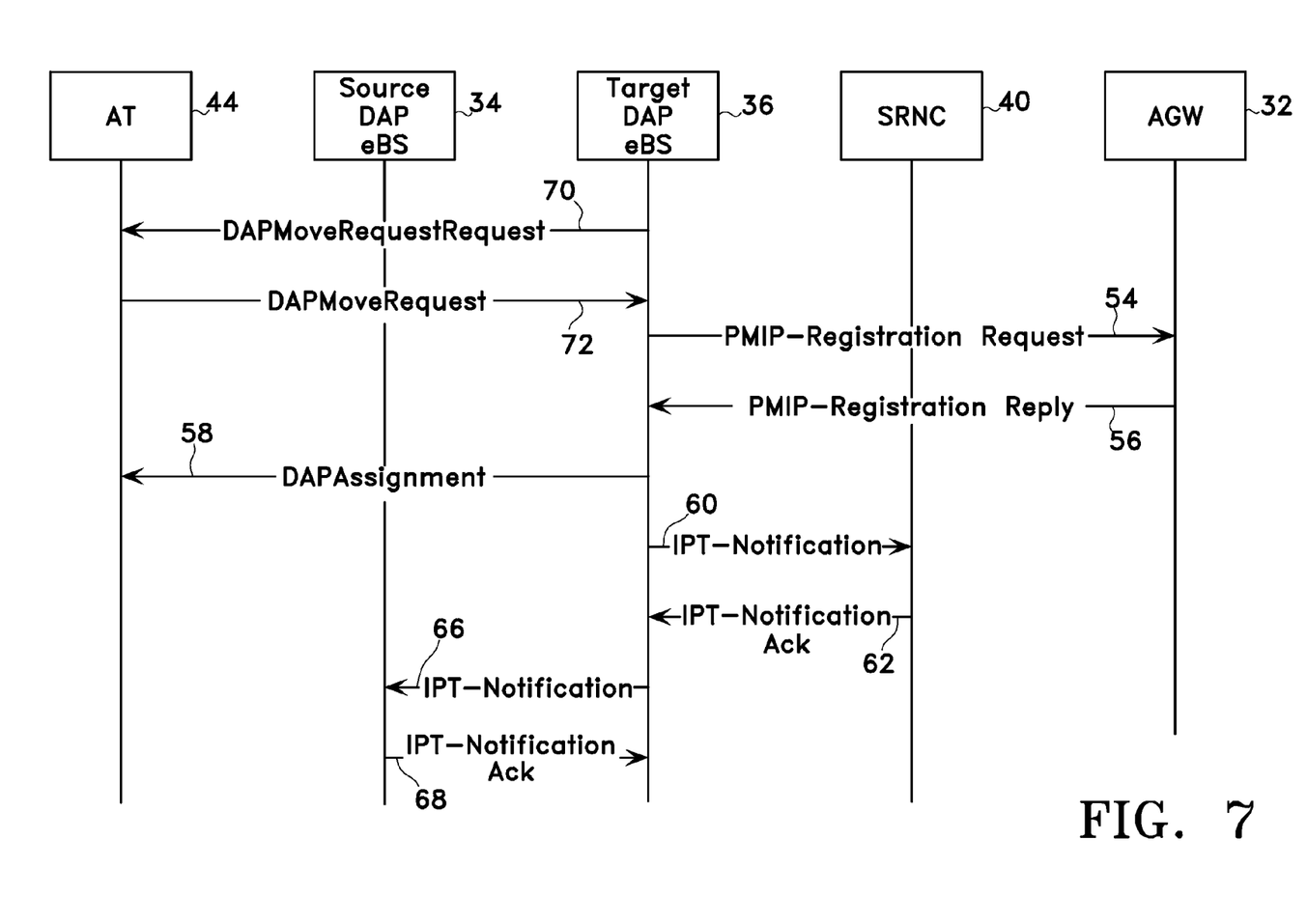
FIG. 7 is a call flow diagram which shows the message flows among the different communication entities operating in a synchronous system in which the DAP handoff is AT-assisted but at the request of one of the communication entities.

FIG. 7 is a message flow diagram which shows another embodiment which illustrates another AT-assisted DAP handoff methodology. In this embodiment, the handoff is initiated by the AT but at the request of an infrastructure entity.

Reference is now made to FIG. 7 in conjunction with FIG. 3. Suppose the eBS 34 is the last entity that performed the PMIP binding with the AGW 40 for the AT 44. As such, the eBS 34 is the current DAP for the AT 44.

As similarly described previously, in an AT-assisted or AT-initiated DAP handoff, the AT 44 assists the eBSs in the RS in making the decision as to which eBS in the RS should be the DAP.

There can be a number of occasions that the communication or infrastructure entities request the AN 44 to initiate a DAP handoff. For instance, the current DAP, the eBS 34 in this case, may be overloaded with calls. To alleviate the congestion, any of the infrastructure entities, such as the eBS 34 or the eBS 36 may make a request to the AT 44 to initiate the handoff process.

As another example, suppose the AT roams into a coverage area communicating with a new eBS which is associated with a new AGW, the new eBS may need to establish a PMIP connection via an AGW handoff, irrespective of whether the new eBS is the FLSE for the AT. Under such a scenario, any of the aforementioned infrastructure or network entities may also request the AT 44 to initiate the DAP handoff process.

Suppose in this case, the target DAP eBS 36 makes such a request to the AT 44 to handoff the DAP from the eBS 34 to the eBS 36. Reference is now made to FIG. 7. The target DAP eBS 36 can make the request via a DAPMoveRequestRequest message sent to the AT 44, as shown in the message flow path 70 in FIG. 7. Included in the DAPMoveRequestRequest message can be LinkID associated with IP packet data route associated with the eBS 36, for example.

The AT 44 may accept or deny such a request. If the AT 44 denies the request, the AT 44 sends a denial message to the eBS 36. Alternatively, the AT 44 may deny the request by allowing a pre-set timer to expire without responding to the eBS 36.

In determining whether to accept or deny the request as in the previous embodiment, a number of factors may be considered. Suppose the eBS 36 is currently the FLSE but not the DAP for the AT 44. If a set of predetermined conditions as described above is met, the AT may accept the DAP handoff request from the eBS 34 to the eBS 36. On the other hand, suppose if the AT 44 does not intend to use the eBS 36 as the FLSE for long, or the communication conditions are not favorable, for instance, the AT 44 may deny the request.

If the request is denied, the DAP handoff process ends with no change of DAP. That is, the AT 44 continues to use the eBS 34 as the current DAP via the IP flow data path 62 (FIG. 3).

Suppose the AT 44 accepts the request. The acceptance is conveyed to the target eBS 36 by sending a DAPMoveRequest message via the message flow path 72 to the EBS 36 in this embodiment.

It should be noted that the AT 44 should not send more than one DAPMoveRequest message within the time limit as set in a preset timer in the message. Moreover, in the AT-assisted DAP handoff process but at the request of an infrastructure entity as described in this embodiment, the target eBS 36 should not send out any DAPAssignment message unless a DAPMoveRequest message, such as the message sent via the message flow path 70, is received by the eBS 36.

Figure 8:
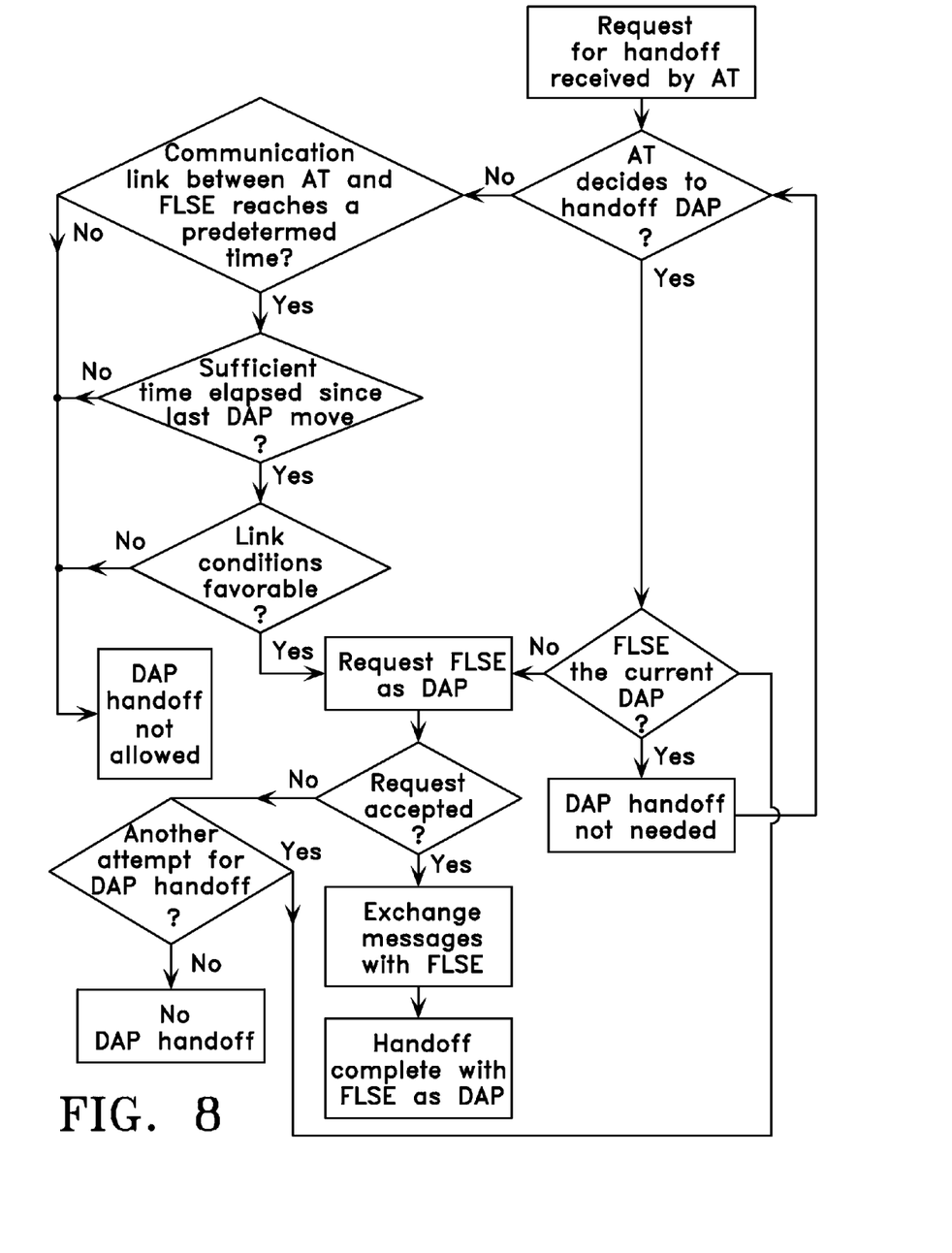
FIG. 8 is a flowchart which shows the procedures the AT takes in determining the AT-assisted DAP handoff at the request of one of the communication entities.

FIG. 8 shows a flow diagram which summarizes the procedures that the AT 44 takes in determining an AT-assisted DAP handoff at the request of a network entity.

Thereafter, the DAP handoff process is substantially similar to the handoff process as described in the previous embodiment. For the sake of clarity and consciousness, the remaining steps shown in FIG. 7 are not further elaborated.

Figure 9:
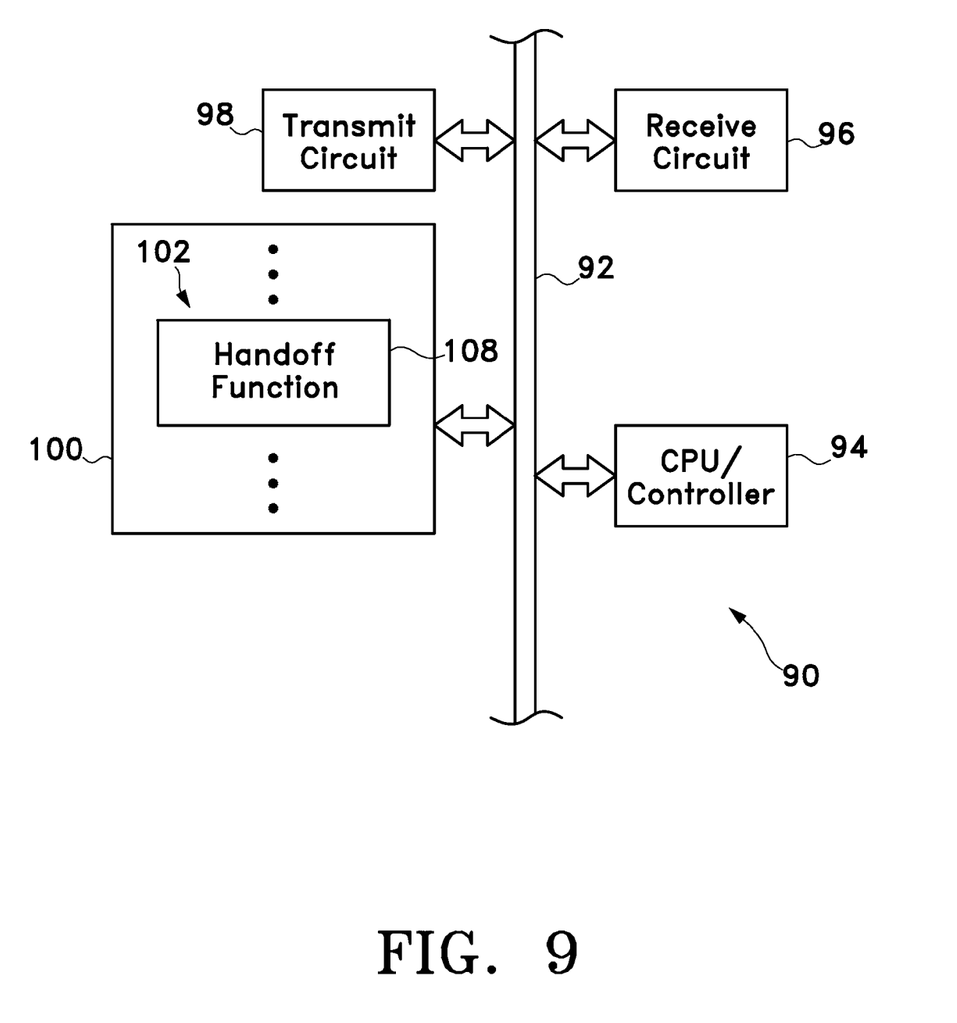
FIG. 9 is a schematic drawing of part of the hardware implementation of an apparatus for executing the DAP handoff processes in accordance with the exemplary embodiments.

FIG. 9 shows the part of hardware implementation of an apparatus for executing the handoff processes as described above. The circuit apparatus is signified by the reference numeral 90 and can be implemented in an AT or any communication entities, such as an eBS or an AGW.

The apparatus 90 comprises a central data bus 92 linking several circuits together. The circuits include a CPU (Central Processing Unit) or a controller 94, a receive circuit 96, a transmit circuit 98, and a memory unit 100.

If the apparatus 90 is part of a wireless device, the receive and transmit circuits 96 and 98 can be connected to a RF (Radio Frequency) circuit but is not shown in the drawing. The receive circuit 96 processes and buffers received signals before sending out to the data bus 92. On the other hand, the transmit circuit 98 processes and buffers the data from the data bus 92 before sending out of the device 90. The CPU/controller 94 performs the function of data management of the data bus 92 and further the function of general data processing, including executing the instructional contents of the memory unit 100.

Instead of separately disposed as shown in FIG. 9, as an alternative, the transmit circuit 98 and the receive circuit 96 can be parts of the CPU/controller 94.

The memory unit 100 includes a set of modules and/or instructions generally signified by the reference numeral 102.

In this embodiment, the modules/instructions include, among other things, a handoff function 108. The handoff function 108 includes computer instructions or code for executing the process steps as shown and described in FIGS. 5-8. Specific instructions particular to an entity can be selectively implemented in the handoff function 108. For instance, if the apparatus 40 is part of an AT, instructions for carrying out the process steps as shown and described in FIGS. 6 and 8 along with the preparation and processing of the messages relevant to the AT as shown and described in FIGS. 5 and 7, can be coded in the handoff function 108. Similarly, if the apparatus 40 is part of a communication entity, for example an eBS, process steps particular to that communication entity can be coded in the handoff function 108.

In this embodiment, the memory unit 100 is a RAM (Random Access Memory) circuit. The exemplary functions, such as the handoff function 108, are software routines, modules and/or data sets. The memory unit 100 can be tied to another memory circuit (not shown) which can either be of the volatile or nonvolatile type. As an alternative, the memory unit 100 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art.

It should be further be noted that the inventive processes as described can also be coded as computer-readable instructions carried on any computer-readable medium known in the art. In this specification and the appended claims, the term "computer-readable medium" refers to any medium that participates in providing instructions to any processor, such as the CPU/controller 94 shown and described in the drawing figure of FIG. 9, for execution. Such a medium can be of the storage type and may take the form of a volatile or nonvolatile storage medium as also described previously, for example, in the description of the memory unit 100 in FIG. 9. Such a medium can also be of the transmission type and may include a coaxial cable, a copper wire, an optical cable, and the air interface carrying acoustic, electromagnetic or optical waves capable of carrying signals readable by machines or computers. The computer-readable medium can be part of a computer product separate from the apparatus 90.

Finally, other changes are possible within the scope of the invention. Other than as described above, any other logical blocks, circuits, and algorithm steps described in connection with the embodiment can be implemented in hardware, software, firmware, or combinations thereof. It will be understood by those skilled in the art that theses and other changes in form and detail may be made therein without departing from the scope and spirit of the invention.

What is claimed is:

1. A method by an access terminal in a wireless communication system, comprising:

communicating with a first evolved Base Station, the first evolved Base Station configured to communicate directly with the access terminal, the first evolved Base Station further configured as a data attachment point of the access terminal;

communicating with a second evolved Base Station, the second evolved Base Station configured to communicate directly with the access terminal and to communicate directly with the data attachment point;

providing an assessment of link conditions of said first and second evolved Base Stations; and initiating, by said access terminal, a handoff of said access terminal from said first evolved Base Station to said second evolved Base Station based on said assessment, the handoff including a first time period when the access terminal receives data transmissions from the second evolved Base Station via the first evolved Base Station, and also including a second time period when the access terminal receives data transmissions from the second evolved Base Station without involving the first evolved Base Station.

2. The method as in claim 1 further comprising communicating with said second evolved Base Station after a predetermined time prior to initiating said handoff.

3. The method as in claim 1 further comprising allowing sufficient time to elapse since the last handoff prior to initiating said handoff.

4. The method as in claim 1 further comprising providing a set of criteria for said link conditions, and initiating said handoff after meeting said set of criteria.

5. The method as in claim 1 further comprising sending a request message to said second evolved Base Station in initiating said handoff.

6. The method as in claim 1 further comprising receiving a handoff request from said second evolved Base Station prior to initiating said handoff.

7. The method as in claim 1 further comprising receiving a notification of assignment of a data attachment point from said second evolved Base Station prior to said handoff.

8. The method as in claim 7 further including a timestamp in said notification of assignment of data attachment point.

9. A method by a target evolved Base Station configured for direct communication with an access terminal in a communication system which includes a source evolved Base Station configured for direct communication with the access terminal and also with the target evolved Base Station, the method comprising:
receiving a handover request message for a handoff of the access terminal from the source evolved Base Station to the target evolved Base Station;
receiving first data transmissions intended for the access terminal from the source evolved Base Station, after receiving the handover request message;
forwarding the first data transmissions to the access terminal;
receiving second data transmissions intended for the access terminal without involving the source evolved Base Station; and
forwarding the second data transmissions to the access terminal.

10. An access terminal configured to operate in a wireless communication system, comprising:
means for communicating with a first evolved Base Station, the first evolved Base Station configured to communicate directly with the access terminal, the first evolved Base Station further configured as a data attachment point of the access terminal;
means for communicating with a second evolved Base Station, the second evolved Base Station configured to communicate directly with the access terminal and to communicate directly with the data attachment point;
means for providing an assessment of link conditions of said first and second evolved Base Stations; and
means for initiating by said access terminal, a handoff of said access terminal from said first evolved Base Station to said second evolved Base Station based on said assessment, the handoff including a first time period when the access terminal receives data transmissions from the second evolved Base Station via the first evolved Base Station, and also including a second time period when the access terminal receives data transmissions from the second evolved Base Station without involving the first evolved Base Station.

11. The access terminal as in claim 10 further comprising means for communicating with said second evolved Base Station after a predetermined time prior to initiating said handoff.

12. The access terminal as in claim 10 further comprising means for allowing sufficient time to elapse since the last handoff prior to initiating said handoff.

13. The access terminal as in claim 10 further comprising means for providing a set of criteria for said link conditions, and initiating said handoff after meeting said set of criteria.

14. The access terminal as in claim 10 further comprising means for sending a request message to said second evolved Base Station in initiating said handoff.

15. The access terminal as in claim 10 further comprising means for receiving a handoff request from said second evolved Base Station prior to initiating said handoff.

16. The access terminal as in claim 10 further comprising means for receiving a notification of assignment of a data attachment point from said second evolved Base Station prior to said handoff.

17. The access terminal as in claim 16 wherein said notification of assignment of data attachment point further including a timestamp.

18. A target evolved Base Station configured for direct communication with an access terminal in a communication system which includes a source evolved Base Station configured for direct communication with the access terminal and also with the target evolved Base Station, the target evolved Base Station comprising:
means for receiving a handover request message for a handoff of the access terminal from the source evolved Base Station to the target evolved Base Station;
means for receiving first data transmissions intended for the access terminal from the source evolved Base Station, after receiving the handover request message;
means for forwarding the first data transmissions received from the source evolved Base Station to the access terminal;
means for receiving second data transmissions intended for the access terminal without involving the source evolved Base Station; and
means for forwarding the second data transmissions to the access terminal.

19. An access terminal configured to operate in a wireless communication system, comprising:
a processor; and
circuitry coupled to said processor, the access terminal configured to:
communicate with a first evolved Base Station, the first evolved Base Station configured to communicate directly with the access terminal, the first evolved Base Station further configured as a data attachment point of the access terminal;
communicate with a second evolved Base Station, the second evolved Base Station configured to communicate directly with the access terminal and to communicate directly with the data attachment point;
provide an assessment of link conditions of said first and second evolved Base Stations; and
initiate by said access terminal, a handoff of said access terminal from said first evolved Base Station to said second evolved Base Station based on said assessment, the handoff including a first time period when the access terminal receives data transmissions from the second evolved Base Station via the first evolved Base Station, and also including a second time period when the access terminal receives data transmissions from the second evolved Base Station without involving the first evolved Base Station.

20. The access terminal as in claim 19 wherein said circuitry and said processor are further configured to communicate with said second evolved Base Station after a predetermined time prior to initiating said handoff.

21. The access terminal as in claim 19 wherein said circuitry and said processor are further configured to allow sufficient time to elapse since the last handoff prior to initiate said handoff.

22. The access terminal as in claim 19 wherein said circuitry and said processor are further configured to provide a set of criteria for said link conditions, and to initiate said handoff after meeting said set of criteria.

23. The access terminal as in claim 19 wherein said circuitry and said processor are further configured to send a request message to said second evolved Base Station in initiating said handoff.

24. The access terminal as in claim 19 wherein said circuitry and said processor are further configured to receive a handoff request from said second evolved Base Station prior to initiate said handoff.

25. The access terminal as in claim 19 wherein said circuitry and said processor are further configured to receive a notification of assignment of a data attachment point from said second evolved Base Station prior to said handoff.

26. The access terminal as in claim 25 wherein said notification of assignment of data attachment point further includes a timestamp.

27. A target evolved Base Station configured for direct communication with an access terminal in a communication system which includes a source evolved Base Station configured for direct communication with the access terminal and also with the target evolved Base Station, comprising:
  a processor; and
  circuitry coupled to said processor, the target evolved Base Station configured to:
    receive a handover request message for a handoff of the access terminal from the source evolved Base Station to the target evolved Base Station;
    receive first data transmissions intended for the access terminal from the source evolved Base Station, after receiving the handover request message;
    forward the first data transmissions received from the source evolved Base Station to the access terminal;
    receive second data transmissions intended for the access terminal without involving the source evolved Base Station; and
    forward the second data transmissions to the access terminal.

28. A computer program product having a non-transitory computer-readable medium which comprises computer-readable instructions for:

communicating with a first evolved Base Station, the first evolved Base Station configured to communicate directly with the access terminal, the first evolved Base Station further configured as a data attachment point of the access terminal;

communicating with a second evolved Base Station, the second evolved Base Station configured to communicate directly with the access terminal and to communicate directly with the data attachment point;

providing an assessment of link conditions of said first and second evolved Base Stations; and initiating by said access terminal, a handoff of said access terminal from said first evolved Base Station to said second evolved Base Station based on said assessment, the handoff including a first time period when the access terminal receives data transmissions from the second evolved Base Station via the first evolved Base Station, and also including a second time period when the access terminal receives data transmissions from the second evolved Base Station without involving the first evolved Base Station.

29. The computer product as in claim 28 wherein said computer-readable medium further comprises computer-readable instructions for communicating with said second evolved Base Station after a predetermined time prior to initiating said handoff.

30. The computer product as in claim 28 wherein said computer-readable medium further comprising computer-readable instructions for allowing sufficient time to elapse since the last handoff prior to initiating said handoff.

31. The computer product as in claim 28 wherein said computer-readable medium further comprises computer-readable instructions for providing a set of criteria for said link conditions, and initiating said handoff after meeting said set of criteria.

32. The computer product as in claim 28 wherein said computer-readable medium further comprises computer-readable instructions for sending a request message to said second evolved Base Station in initiating said handoff.

33. The computer product as in claim 28 wherein said computer-readable medium further comprises computer-readable instructions for receiving a handoff request from said second evolved Base Station prior to initiating said handoff.

34. The computer product as in claim 28 wherein said computer-readable medium further comprises computer-readable instructions for receiving a notification of assignment of data attachment point from said second evolved Base Station prior to said handoff.

35. The computer product as in claim 28 said notification of assignment of data attachment point further including a timestamp.

* * * * *